United States Patent
Heitmann et al.

(10) Patent No.: US 10,231,380 B2
(45) Date of Patent: *Mar. 19, 2019

(54) COMBINE HARVESTER

(71) Applicant: CLAAS SELBSTFAHRENDE ERNTEMASCHINEN GMBH, Harsewinkel (DE)

(72) Inventors: Christoph Heitmann, Warendorf (DE); Andreas Wilken, Bissendorf (DE); Joachim Baumgarten, Beelen (DE); Sebastian Neu, Bad Laer (DE); Christoph Bussmann, Harsewinkel (DE); Henner Voecking, Rietberg (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 451 days.

This patent is subject to a terminal disclaimer.

(21) Appl. No.: 15/084,686

(22) Filed: Mar. 30, 2016

(65) Prior Publication Data

US 2016/0286721 A1    Oct. 6, 2016

(30) Foreign Application Priority Data

Apr. 2, 2015 (DE) ................ 10 2015 004 343

(51) Int. Cl.
| | | |
|---|---|---|
| *A01D 41/127* | (2006.01) | |
| *A01F 12/18* | (2006.01) | |
| *G05B 13/04* | (2006.01) | |

(52) U.S. Cl.
CPC ....... *A01D 41/127* (2013.01); *A01D 41/1271* (2013.01); *A01D 41/1272* (2013.01);
(Continued)

(58) Field of Classification Search
CPC .............. A01D 41/127; A01D 41/1272; A01D 41/1271; A01D 41/1273; A01F 12/18
See application file for complete search history.

(56) References Cited

U.S. PATENT DOCUMENTS

| | | | | |
|---|---|---|---|---|
| 4,296,409 A | * | 10/1981 | Whitaker et al. .... | A01D 41/127 701/34.2 |
| 7,670,218 B2 | | 3/2010 | Behnke et al. | |

(Continued)

FOREIGN PATENT DOCUMENTS

| | | |
|---|---|---|
| DE | 10 2009 009 767 | 8/2010 |
| EP | 1 543 712 | 6/2005 |

(Continued)

*Primary Examiner* — Dale W Hilgendorf
(74) *Attorney, Agent, or Firm* — Collard & Roe, P.C.

(57) ABSTRACT

A combine harvester includes a threshing unit for threshing picked-up crop to obtain grain, a driver assistance system, with a memory for storing data, for controlling the threshing unit, and a computing unit for processing at least the data stored in the memory. A sensor system ascertains at least a portion of the current harvesting-process state. A sensor configuration assigned to the sensor system is defined by the type and scope of operational sensors is stored or can be stored in the memory. A functional system model for at least a portion of the combine harvester is stored in the memory. The computing unit is designed to carry out an autonomous determination of a threshing-unit parameter based on the system model, and defines the system model forming a basis of the control of the threshing unit depending on the sensor configuration stored in the memory.

11 Claims, 7 Drawing Sheets

(52) U.S. Cl.
CPC .......... *A01D 41/1273* (2013.01); *A01F 12/18* (2013.01); *G05B 13/04* (2013.01)

(56) References Cited

U.S. PATENT DOCUMENTS

| | | |
|---|---|---|
| 8,406,964 B2 | 3/2013 | Baumgarten et al. |
| 9,125,344 B2 | 8/2015 | Baumgarten et al. |
| 9,403,536 B2 | 8/2016 | Bollin et al. |
| 2003/0014171 A1* | 1/2003 | Ma et al. ............. A01D 41/127 701/50 |
| 2012/0004813 A1* | 1/2012 | Baumgarten et al. ...................... A01D 41/127 701/50 |
| 2014/0129048 A1* | 5/2014 | Baumgarten et al. ...................... A01D 41/127 701/1 |
| 2014/0215984 A1* | 8/2014 | Bischoff ............. A01D 41/127 50/10.2 R |

FOREIGN PATENT DOCUMENTS

| | | |
|---|---|---|
| EP | 1 731 017 | 12/2006 |
| EP | 1 902 609 | 3/2008 |
| EP | 2 687 924 | 1/2014 |
| EP | 2 728 523 | 5/2014 |
| EP | 2 837 279 | 2/2015 |

\* cited by examiner

COMBINE HARVESTER

CROSS-REFERENCE TO A RELATED APPLICATION

The invention described and claimed hereinbelow is also described in German Patent Document DE 10 2015 004 343.9, filed on Apr. 2, 2015. The German Patent Application, the subject matters of which is incorporated herein by reference, provides the basis for a claim of priority of invention under 35 U.S.C. 119(a)-(d).

BACKGROUND OF THE INVENTION

The present invention relates to a combine harvester with a threshing unit and a driver assistance system for controlling the threshing unit and a sensor system for ascertaining at least a portion of the current harvesting-process state.

Combine harvesters are used for mowing and the threshing of grain. The threshing is carried out with a threshing unit, which obtains grain from the crop picked up by the combine harvester by a header. The grain, after threshing, separation and subsequent cleaning, is fed to a grain tank. The chaff and the straw, for example, remain as further components of the crop and are either spread onto the field or, in the case of straw, set down as swath, e.g., to be subsequently picked up by a baler. Here and in the following, the term "crop" is intended to mean the entirety of the crop stream picked up by the threshing unit, i.e., including the grains that have not yet been obtained as grain from the crop, and the grains that may remain in the crop stream as a loss and that may be deposited with the straw.

In the threshing unit, the grain is rubbed, i.e., threshed, out of the straw by a processing, which is rolling, in principle, and is separated from the remaining crop stream, so that it is fed directly to the cleaning system. The remaining crop stream is then fed to the separation area in which the remaining grain is separated from the crop stream, e.g., by a straw-walker system, and is then likewise fed to the cleaning system.

There is an entire series of criteria on the basis of which the quality of the threshing process is evaluated. First, preferably all the grain should be removed from the crop stream and fed to the grain tank, specifically, with as few broken kernels as possible and with a minimal portion of material other than grain. Secondly, the straw should not be damaged and, e.g., cut up, to such an extent that subsequent utilization is adversely affected. Third, the time required for the processing of a field should be short and the associated fuel consumption should be kept as low as possible. Further quality criteria are conceivable. Depending on the overall situation, in particular on the particular basic economic conditions, different quality criteria are paramount, which criteria collectively form a harvesting-process strategy for carrying out the harvesting process.

In order for the aforementioned quality criteria to be met, the threshing unit must be controlled in a certain manner, wherein this manner depends not only on the special quality criteria, but also on different conditions of the environment, of the combine harvester and, in particular, of the threshing unit itself, and on the type and composition of the crop. The prioritization of one quality criterion is usually a disadvantage for another quality criterion.

DE 10 2009 009 767 A1 discloses a combine harvester comprising a driver assistance system that measures different variables (e.g., drum speed, concave width, grain losses) on the combine harvester and checks the measured variables to determine whether they pass into a critical value range or exceed or undershoot critical limit values. If this situation occurs, the driver assistance system interactively communicates with the driver by proposing, to the driver, measures to take during the control of the threshing unit that are intended for moving out of the critical value range. The driver can then accept or reject these proposals, wherein, in a subsequent step, alternative proposals may be made to the driver, or the driver can specify the proposed measures more precisely by an entry. For the purpose of measuring the aforementioned variables, the driver assistance system is equipped with a sensor system comprising different sensors for recording different types of losses, such as threshing losses, separation losses, cleaning losses, or the like.

A challenge for implementing the driver assistance system is that different combine harvesters, due to the equipment package thereof, can have different sensor systems, which are usually complex, and the particular sensor system may also expand or be reduced over the course of a product life cycle of the combine harvester. In addition, individual sensors of the sensor system can fail due to wear. The aforementioned aspects can complicate the production of the combine harvester, and the latter aspect can adversely affect the operation of the combine harvester.

SUMMARY OF THE INVENTION

The present invention overcomes the shortcomings of known arts, such as those mentioned above.

To that end, the present invention provides a combine harvester comprising a driver assistance system and that uses complex sensor systems.

In one aspect, the invention relies on initially assigning to a sensor system a sensor configuration, which is defined by the type and scope of operational sensors of the sensor system, and carrying out the control of the threshing unit depending on the sensor configuration.

A functional system model for at least one part of the combine harvester is stored in the memory of the driver assistance system. The functional system model, together with the harvesting-process state, forms the basis for the autonomous determination of the at least one threshing-unit parameter. The term "functional system model" means that at least a portion of the functional interrelationships within the combine harvester are depicted by the system model. Examples of this are provided further below.

The harvesting process state forms a basis for the autonomous, in particular, determination of the at least one threshing-unit parameter in this case and preferably in that the system model is aligned with the harvesting process state in a manner to be explained below. In this case, the harvesting process state refers to all state variables that are related to the harvesting process in any manner. These include field information and/or harvesting-process parameters and/or threshing-unit parameters and/or environmental information.

It is essential that the computing unit defines the system model on which the control of the threshing unit is based, depending on the sensor configuration stored in the memory. This, in turn, accounts for the consideration that there are different possibilities for the autonomous, in particular, control of the threshing unit depending on the particular operational sensors that are available. For example, an autonomous control makes sense only depending on harvesting-process parameters that also are determined by the sensor system.

In an embodiment, the threshing unit, together with the driver assistance system, forms an automated threshing unit.

This means that the driver assistance system, with its memory for storing data and with its computing unit, is designed to autonomously determine individual machine parameters of the threshing unit and to assign them to the threshing unit. Such machine parameters are referred to here as "threshing-unit parameters." The basis for the determination of the threshing-unit parameters is a selection, made by the user, of harvesting process strategies, which are stored in the memory of the driver assistance system. As a result, a manner of controlling the threshing unit is specified by the driver making a single selection of the active harvesting-process strategy. Another entry by the driver is not required in order for the threshing-unit parameters to be determined, in the narrower sense. The driver has the possibility, however, of changing the selected harvesting-process strategy if so desired, however, so that autonomous control subsequently continues, although possibly with a different prioritization.

In order to depict the functional interrelations by use of the system model, a parameter group of harvesting-process parameters is defined, to each of which at least one family of characteristics is assigned, wherein the harvesting-process parameter is the output variable of the particular family of characteristics. By an aforementioned family of characteristics, it also is possible to depict complex functional interrelations with little computing effort. Preferably, the parameter group is defined by the computing unit depending on the sensor configuration, i.e., depending on the detectability of different harvesting-process parameters by sensors.

An aforementioned family of characteristics, in this case and preferably very generally, is the dependence of an output variable on at least one input variable, in particular, on two or multiple input variables.

Further preferably, the invention provides that the computing unit aligns at least one of the families of characteristics with the actual harvesting-process state, during on-going operation, preferably cyclically, wherein the definition of the system model by the computing unit depending on the sensor configuration stored in the memory also includes, in addition to the definition of the families of characteristics, a definition of the alignment of the system model. The definition of the alignment includes information on whether the relevant family of characteristics should be aligned in a sensor-based manner or whether the relevant family of characteristics should not be aligned, in principle. In both cases, it is preferably possible for the user to intervene.

The term "cyclical" is intended to be interpreted broadly herein and, in the present case, refers to a particular continuous activity having a cycle time that is constant but also varies.

One embodiment of the invention accounts for the fact that the particular present sensor configuration can change, such as due to a wear-induced failure of a sensor, i.e., the computer unit carries out a cyclical, in particular, check of the sensors and stores the resultant sensor configuration in the memory.

BRIEF DESCRIPTION OF THE DRAWINGS

Further details, features, objectives, and advantages of the present invention are explained in greater detail in the following on the basis of the drawing of a preferred exemplary embodiment. In the drawings.

DETAILED DESCRIPTION OF THE PREFERRED EMBODIMENTS

The following is a detailed description of example embodiments of the invention depicted in the accompanying drawings. The example embodiments are presented in such detail as to clearly communicate the invention and are designed to make such embodiments obvious to a person of ordinary skill in the art. However, the amount of detail offered is not intended to limit the anticipated variations of embodiments; on the contrary, the intention is to cover all modifications, equivalents, and alternatives falling within the spirit and scope of the present invention, as defined by the appended claims.

Figure 1:
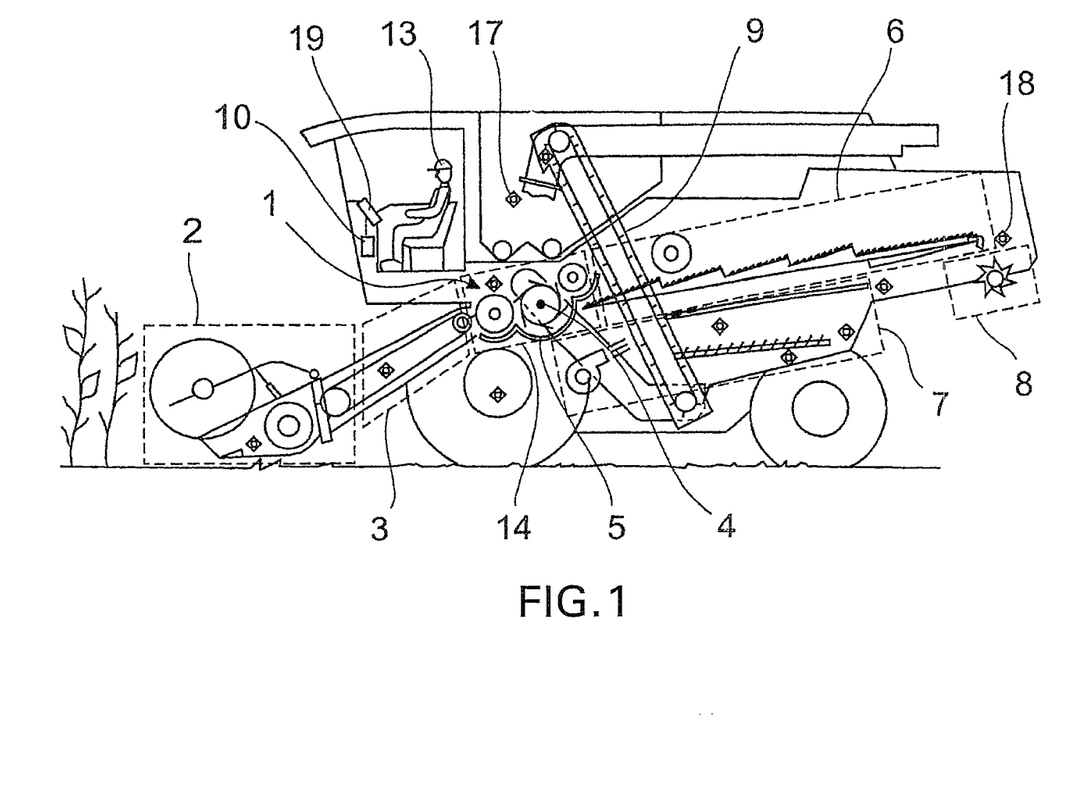
FIG. 1 shows a side view of a combine harvester according to the invention.
Figure 2:
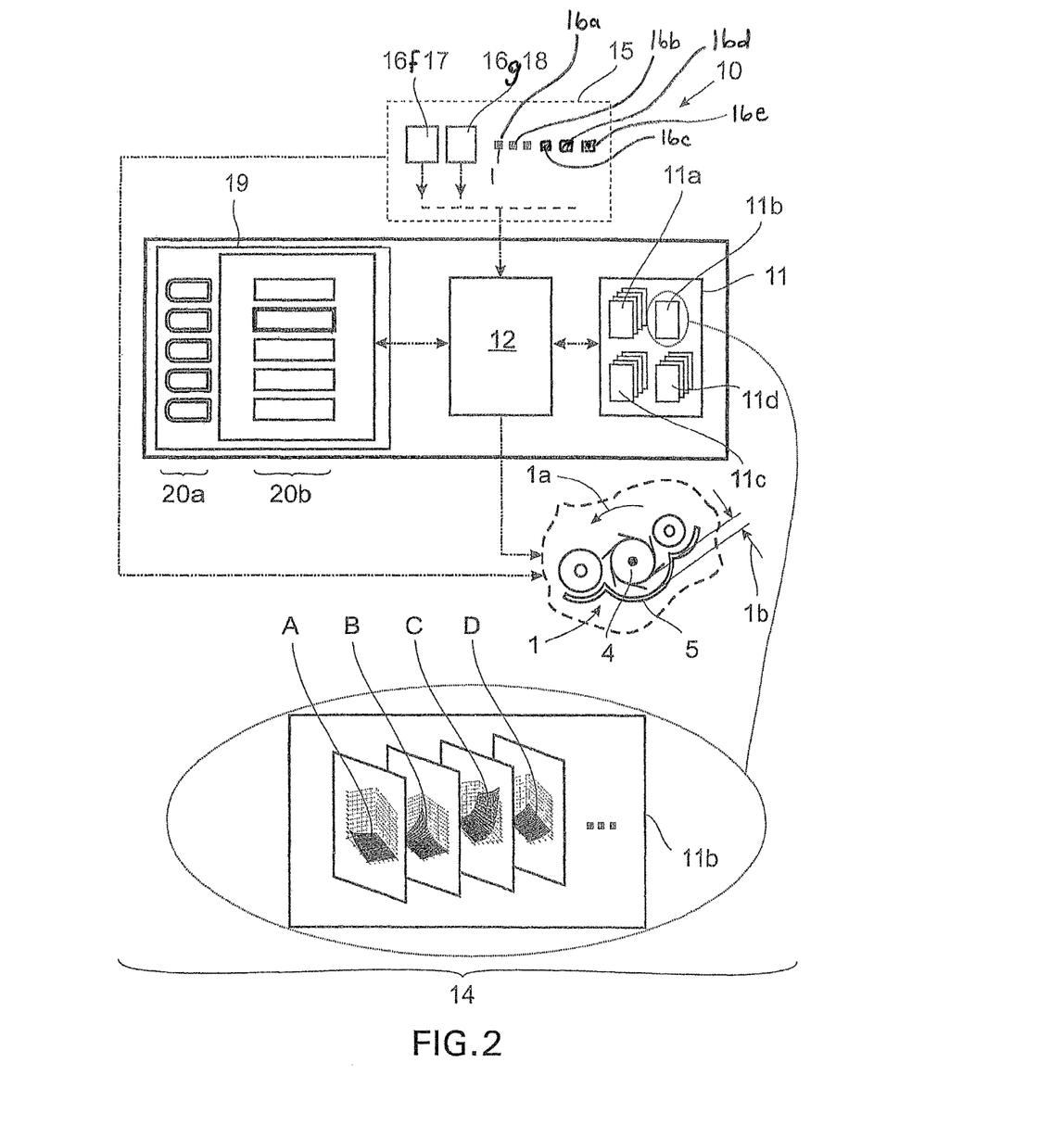
FIG. 2 shows a schematic depiction of a driver assistance system of a combine harvester according to the invention.

FIGS. 1 and 2 show a combine harvester according to the invention comprising a threshing unit 1 for threshing picked-up crop to obtain grain. Crop is intended to mean the entirety of material that is picked up from the field and fed to the threshing unit 1, wherein grain refers to the kernels obtained from the crop by the combine harvester. As is apparent from FIG. 1, a field is mowed by a header 2 of the combine harvester and the crop obtained as a result is fed by a slope conveyor 3 to the threshing unit 1.

The threshing unit 1 is equipped with a threshing drum 4, which interacts with a threshing concave 5. A separation system 6 is disposed downstream of the threshing unit 1 in terms of processing. The crop stream fed to the threshing unit 1 is therefore subsequently fed, without the grain already obtained here, to the separation system 6.

In principle, the threshing unit 1 is used to rub the preponderant portion of the grain out of the straw of the crop by the threshing process. In the separation system 6, the crop is then moved, e.g., shaken, along with the grain portion remaining therein, in such a way that the remaining grain is also preferably separated from the straw and the rest of the crop. The grain obtained in the threshing unit 1 and in the separation system 6 is then fed to a cleaning system 7. In the cleaning system 7, which usually has multiple stages, material other than grain, e.g., chaff and straw parts, which has been carried along in the grain up to this point, as well as non-threshed material, such as, e.g., ear tips or awns, are separated from the grain. The cleaned grain then passes via a transport system 9, e.g., a grain elevator, into a grain tank 17. The threshed straw, i.e., the crop remaining in the separation system 6, is deposited by the combine harvester, e.g., as swath, along the wheel track.

An aforementioned threshing unit 1 is controlled via the specification of different machine parameters. Depending on the design of the combine harvester 1, said machine parameters include, for example, a drum speed 1a or any other motional characteristic values of the threshing drum 4, and a concave width 1b, i.e., the spacing between the threshing drum 4 and a threshing concave 5 (FIG. 2). Provided the threshing unit 1 comprises filler plates, these also can be adjusted within the scope of the control of the threshing unit 1.

The combine harvester according to the invention further comprises a driver assistance system 10 for controlling the threshing unit 1. This driver assistance system 10 comprises a memory 11 for storing data, i.e., a memory in the sense of information technology, and a computing unit 12 for processing the data stored in the memory 11. In principle, the driver assistance system 10 is designed to support a driver 13 of the combine harvester during the operation of the combine harvester. The driver assistance system 10 comprising the memory 11 and the computing unit 12 is schematically shown in FIG. 2.

According to the invention, a sensor system 15 for detecting at least a portion of the current harvesting-process state is provided. The sensor system is equipped with multiple sensors 16a-16g in this case. Examples of the different sensors 16 are discussed further below.

Assigned to the sensor system 15 is a sensor configuration 11c, which is defined by the type and scope of operational sensors 16 of the sensor system 15 and is stored or can be stored in the memory 11.

A functional system model 11b for at least one part of the combine harvester is stored in the memory 11, wherein the computing unit 12 is designed to carry out an autonomous, in particular, determination of at least one threshing-unit parameter, such as drum speed and concave width 1a, 1b, based on the system model 11b and the harvesting-process state. The functional system model 11b is a computational model for depicting functional interrelations within the combine harvester. Examples of such functional interrelations are explained further below.

The computing unit 12 defines the system model 11b, on which the control of the threshing unit 1 is based, depending on the sensor configuration 11c stored in the memory 11. This is explained further below by reference to examples.

The threshing unit 1, together with the driver assistance system 10, preferably forms an automated threshing unit 14. This is realized according to the invention in that a plurality of selectable harvesting-process strategies 11G is stored in the memory 11 and, in order to implement the selected harvesting-process strategy 11a or the harvesting-process strategies 11a, the computing unit 12 is designed to autonomously determine at least one machine parameter for the threshing unit 1 and specify said machine parameter to the threshing unit 1. Such machine parameters for the threshing unit 1 are referred to here as "threshing-unit parameters". In this manner, an automated threshing unit 14 is provided, which comprehensively regulates all variables that are relevant for the work of the threshing unit 1, such that the variables are coordinated with one another. The situation is therefore avoided, in particular, in which there are competing or conflicting controls which come from different directions and could possibly cancel each other out. Instead, the control of all relevant parameters is carried out "under one roof." In addition, the driver 13 can specify a desired qualitative result and does not need to have his own expert knowledge of the details required for this result.

The determination of the threshing-unit parameters is an autonomous determination to the extent that, in principle, the harvesting-process strategy 11a is implemented by the computing unit 12 without the need for intervention by the driver 13 or for a query to the driver 13 during the determination of the threshing-unit parameters, such as drum speed and concave width 1a, 1b in the narrower sense. Such an intervention by the driver 13 is therefore still possible, in principle, but is not necessary. In this case, the stored harvesting-process strategies 11a differ in terms of the objective of setting or optimizing harvesting-process parameters, which will be explained further below.

It should be noted that the driver assistance system 10 can be centrally designed, in principle. The driver assistance system is used to control not only the threshing unit 1, but also working units installed upstream and downstream, such as the header 2, the slope conveyor 3, the separation system 6, the cleaning system 7 and the spreader system 8. In principle, it also is conceivable that the driver assistance system 10 is decentrally structured and is composed of a number of individual control systems. It can then be provided, for example, that at least a portion of the working units of the combine harvester each have an assigned, decentral control system.

The system model 11b is aligned with the current harvesting-process state by the computing unit 12, preferably during the on-going harvesting operation. This means that the computing unit 12 checks to determine whether the functional interrelations depicted in the system model 11b match the actual harvesting-process state. If this check reveals deviations, the computing unit 12 implements an appropriate change in the system model 11b. In an embodiment, this alignment takes place cyclically, wherein reference is made to the general part of the description with respect to the broad interpretation of the term "cyclically".

In the sense of short reaction times of the combine harvester to changing harvesting-process states, it is provided that the computing unit 12 determines the threshing-unit parameters cyclically, in the sense described above. Reference is made to the broad interpretation of the term "cyclically" in this context as well.

As explained further above, the term "harvesting-process state" includes all information related to the harvesting process. This includes field information such as "crop density", "threshability of the crop", and "crop moisture". This further includes the harvesting-process parameter "threshing losses" as a measure of the non-threshed kernels deposited onto the field, the harvesting-process parameter "broken grain portions" as a measure of the broken kernels deposited in the grain tank, the harvesting-process parameter "material feed height" as a measure of the throughout, the harvesting-process parameter "separation losses" as a measure of the kernels deposited on the field by the separation system 6, the harvesting-process parameter "cleaning losses" as a measure of the kernels deposited on the field by the cleaning system 7, the harvesting-process parameter "slip threshing-unit drive" as a measure of the threshing-unit load, and the harvesting-process parameter "fuel consumption" as a measure of the energy consumption of the threshing-unit drive. Finally, the field information also includes threshing-unit parameters such as "drum speed" and "concave width", as well as environmental information such as "ambient temperature" and "ambient moisture". All this information to be incorporated into the computation of the harvesting-process state is determined in different ways.

With regard to the term "material feed height", it should be noted that this term should be broadly interpreted and includes both the material feed height of the crop stream picked up by the threshing unit, in the narrower sense, as well as the throughput of the crop stream passing through the threshing unit 1. In this regard, all the interpretations of the material feed height apply equally to the throughput. In particular, the term "material feed height" is replaced by the term "throughput" in the present case.

The sensor system 15 can comprise different sensors 16 depending on the equipment package of the combine harvester. Depending on the sensor configuration 11*c*, one or more of the harvesting-process parameters "threshing losses" id determined by a threshing-loss sensor 16*a*, "broken grain portion" is determined by a broken-grain sensor 16*d*, "material feed height" is determined by a material feed height sensor 16*f*, "separation losses" is determined by a separation-loss sensor 16*b*, "cleaning losses" is determined by a cleaning-loss sensor 16*e*, "slip threshing-unit drive" is determined by a slip sensor 16*c*, and "fuel consumption" is determined by a non-illustrated fuel consumption sensor.

Alternatively, or additionally, the sensor system 15, as depicted in FIG. 2, can comprise a swath sensor 16*g* for ascertaining a piece of swath information. A swath sensor 16*g*, when suitably designed, is used to detect a grain portion in the swath 18.

The harvesting-process strategies 11*a* under discussion, which is selected by the driver 13, are each directed toward different objectives. In a first variant, at least one harvesting-process strategy 11*a* is directed to the objective of setting or optimizing at least one harvesting-process parameter such as "threshing losses", "broken grain portion", "separation losses", "cleaning losses", "slip threshing-unit drive", "fuel consumption", or the like. The implementation of the harvesting-process strategies 11*a* should take place in each case by a corresponding specification of threshing-unit parameters, in this case and preferably the threshing-unit parameters "drum speed" and "concave width", which are paramount for the control of the threshing unit 1.

In order to depict the functional interrelations, a parameter group of harvesting-process parameters is defined, to each of which at least one family of characteristics A-J of the system model 11*b* is assigned, which family of characteristics depicts functional interrelations of the combine harvester and is stored in the memory 11, wherein the particular harvesting-process parameter is the output variable of the assigned, at least one family of characteristics A-J.

In an embodiment and as depicted in FIGS. 3 to 7 (FIGS. 3*a*, 3*b*, 4*a*, 4*b*, 7*a*, 7*b*), the harvesting-process parameter "material feed height" and one threshing-unit parameter, preferably the threshing-unit parameter "drum speed" or the threshing-unit parameter "concave width", are defined as input variables for the at least one family of characteristics A-J.

In order to depict the functional interrelations between one harvesting-process parameter as the output variable and different input variables, a first family of characteristics and a second family of characteristics are assigned to this harvesting-process parameter. In this case, the input variables for the first family of characteristics A, C, E, G, I, are the further harvesting-process parameter "material feed height" and the threshing-unit parameter "drum speed" (depiction a in FIGS. 3 to 7), while the further harvesting-process parameter "material feed height" and the threshing-unit parameter "concave width" form the input variables for the second family of characteristics B, D, F, H, J (depiction b in FIGS. 3 to 7).

Figure 3A:
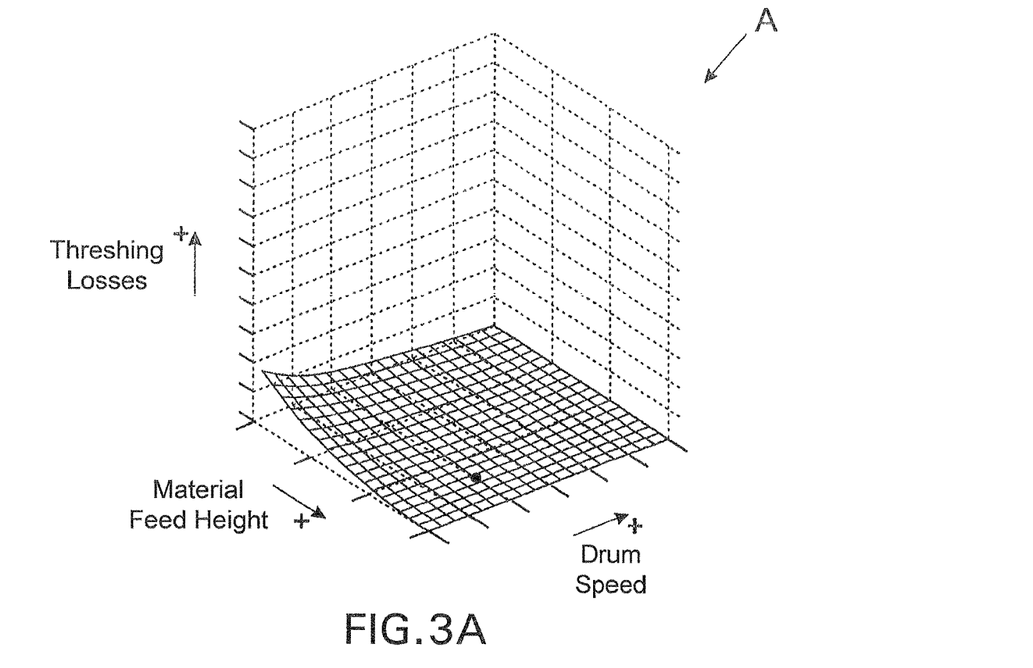
FIG. 3a shows the family of characteristics A for the functional interrelation between the output variable "threshing losses" and the input variables "material feed height" and "drum speed;"

FIG. 3*a* shows a family of characteristics A for the functional interrelation between the output variable "threshing losses" and the input variables "material feed height" and "drum speed". As indicated, threshing is that much better the higher the input variable "material feed height", which represents the throughput, and the higher the threshing drum speed are.

Figure 3B:
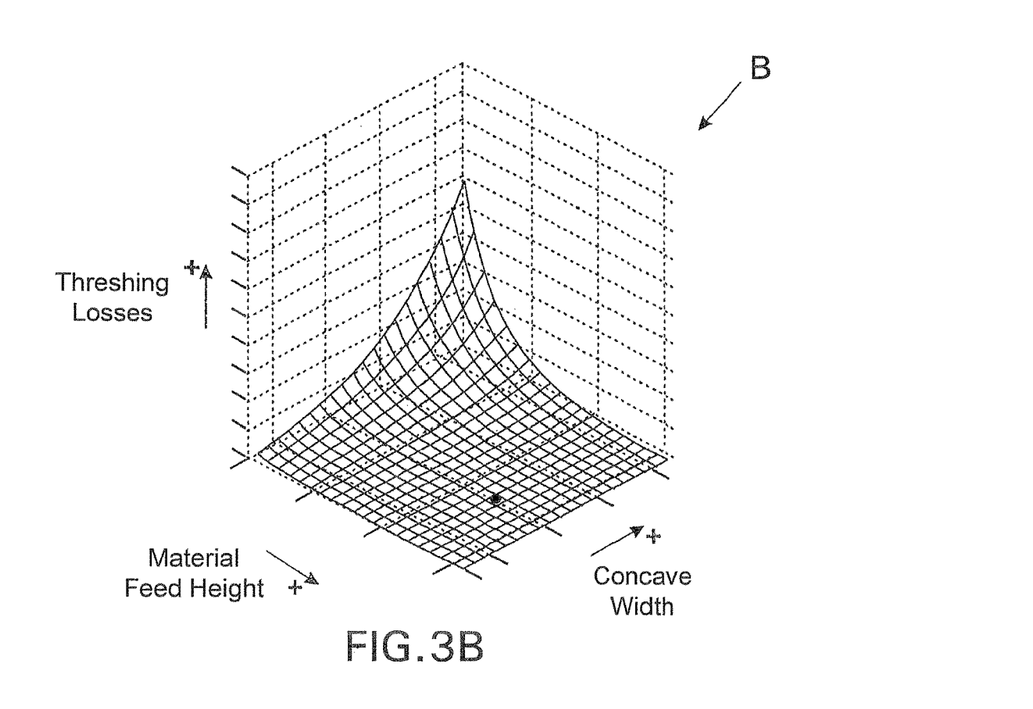
FIG. 3b shows the family of characteristics B for the functional interrelation between the output variable "threshing losses" and the input variables "material feed height" and "concave width;"

FIG. 3*b* shows the family of characteristics B for the functional interrelation between the output variable "threshing losses" and the input variables "material feed height" and "concave width". As indicated, threshing is that much better the higher the material feed height, which represents the throughput, and the smaller the concave width are.

Figure 4A:
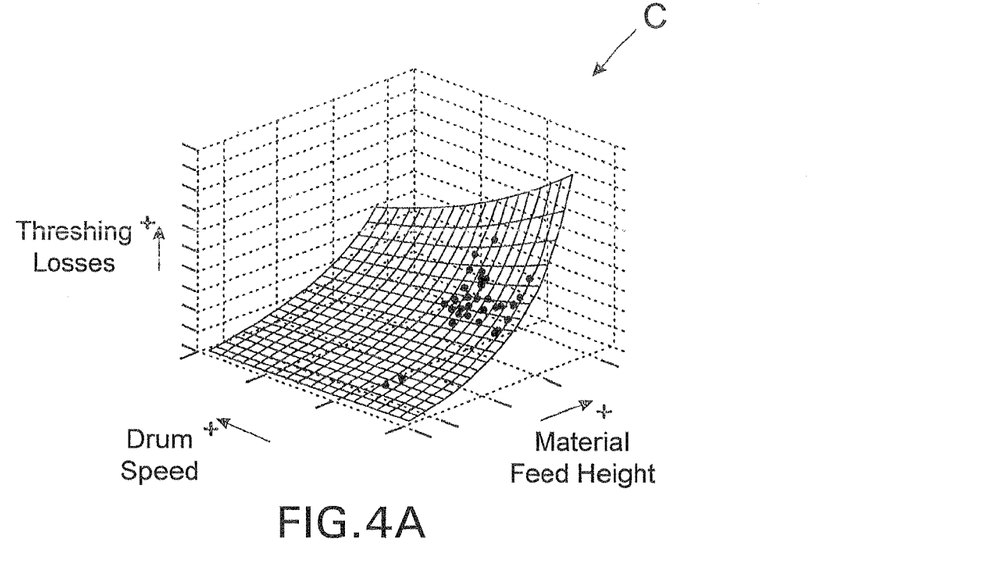
FIG. 4a shows the family of characteristics C for the functional interrelation between the output variable "threshing losses" and the input variables "material feed height" and "drum speed;"

FIG. 4*a* shows the family of characteristics C for the functional interrelation between the output variable "threshing losses" and the input variables "material feed height" and "drum speed". As indicated, as the material feed height increases and the threshing drum speed decreases, the separation losses increase or the separation decreases.

Figure 4B:
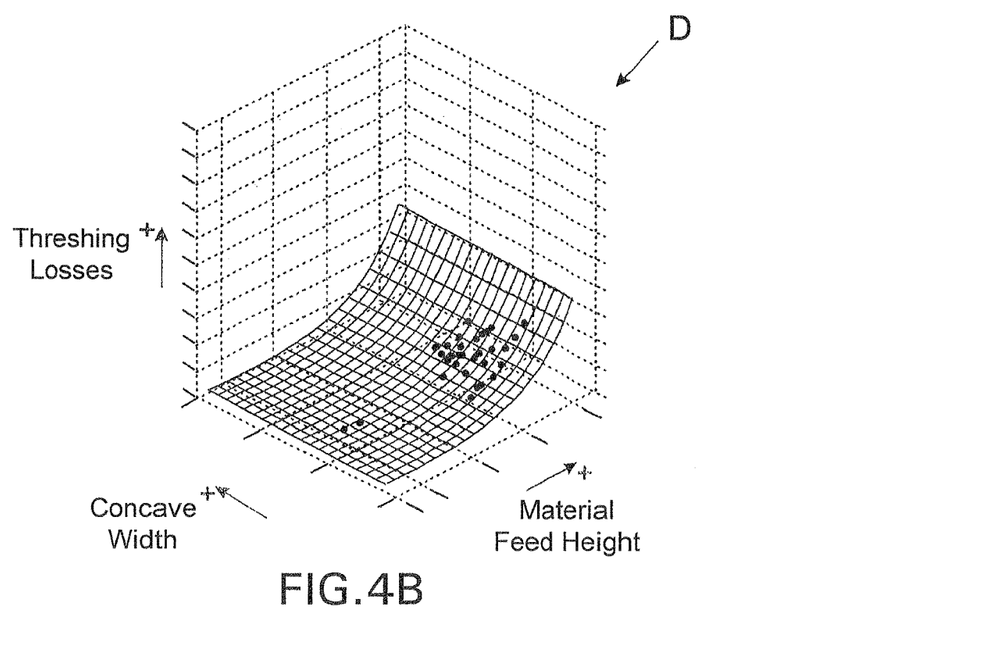
FIG. 4b shows the family of characteristics D for the functional interrelation between the output variable "threshing losses" and the input variables "material feed height" and "concave width;"

FIG. 4*b* shows the family of characteristics D for the functional interrelation between the output variable "threshing losses" and the input variables "material feed height" and "concave width". As indicated, as the material feed height, which represents the throughput, increases and the concave width increases, the separation losses increase.

Figure 5A:
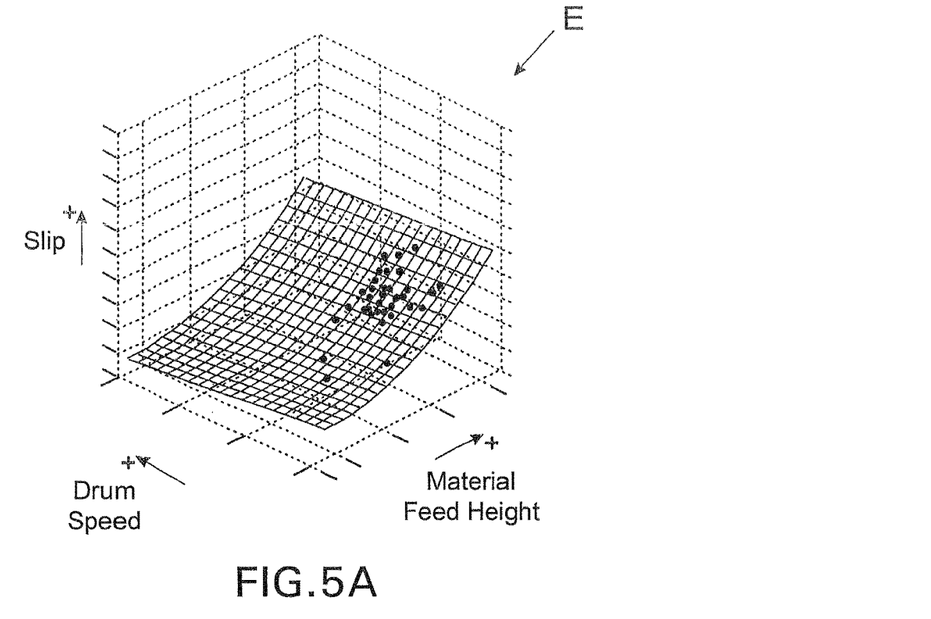
FIG. 5a shows the family of characteristics E for the functional interrelation between the output variable "slip threshing-unit drive", which represents the threshing-unit load, and the input variables "material feed height" and "drum speed;"

FIG. 5*a* shows the family of characteristics E for the functional interrelation between the output variable "slip threshing-unit drive", which represents the threshing-unit load, and the input variables "material feed height" and "drum speed." As indicated, as the material feed height, which represents the throughput, increases and the drum speed decreases, the load on the threshing unit, which is the slip in the drive train of the threshing unit in this case, decreases.

Figure 5B:
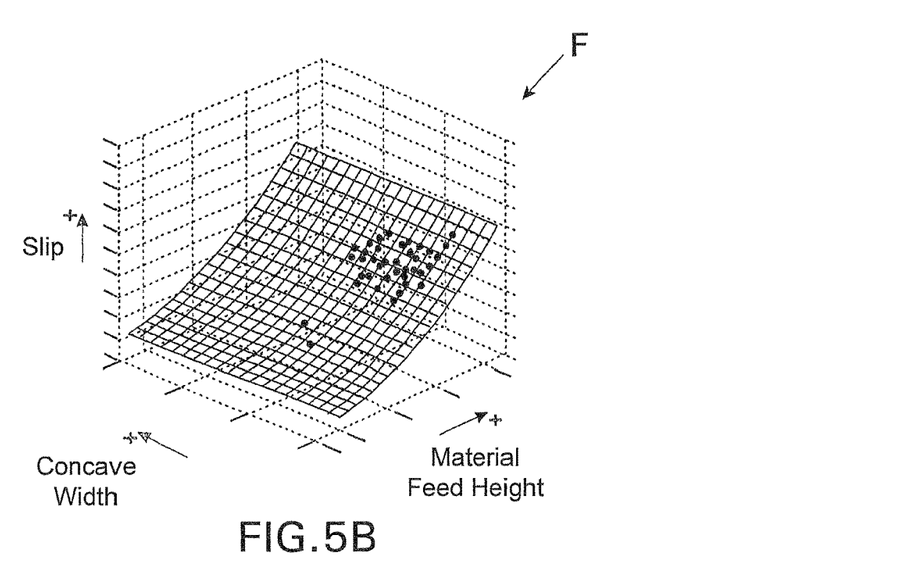
FIG. 5b shows the family of characteristics F for the functional interrelation between the output variable "slip threshing-unit drive" and the input variables "material feed height" and "concave width".

FIG. 5*b* shows the family of characteristics F for the functional interrelation between the output variable "slip threshing-unit drive" and the input variables "material feed height" and "concave width." As indicated, as the material feed height increases and the concave width decreases, the slip in the threshing-unit drive increases.

Figure 6A:
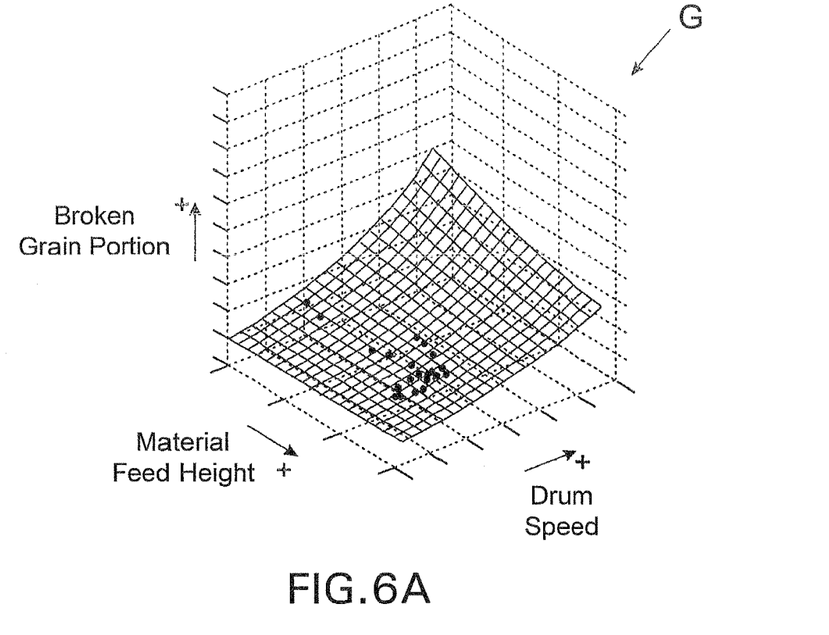
FIG. 6a shows the family of characteristics G for the functional interrelation between the output variable "broken grain portion" and the input variables "material feed height" and "drum speed;"

FIG. 6*a* shows the family of characteristics G for the functional interrelation between the output variable "broken grain portion" and the input variables "material feed height" and "drum speed." As indicated, as the drum speed 1*a* increases and the material feed height decreases, the broken grain portion increases.

Figure 6B:
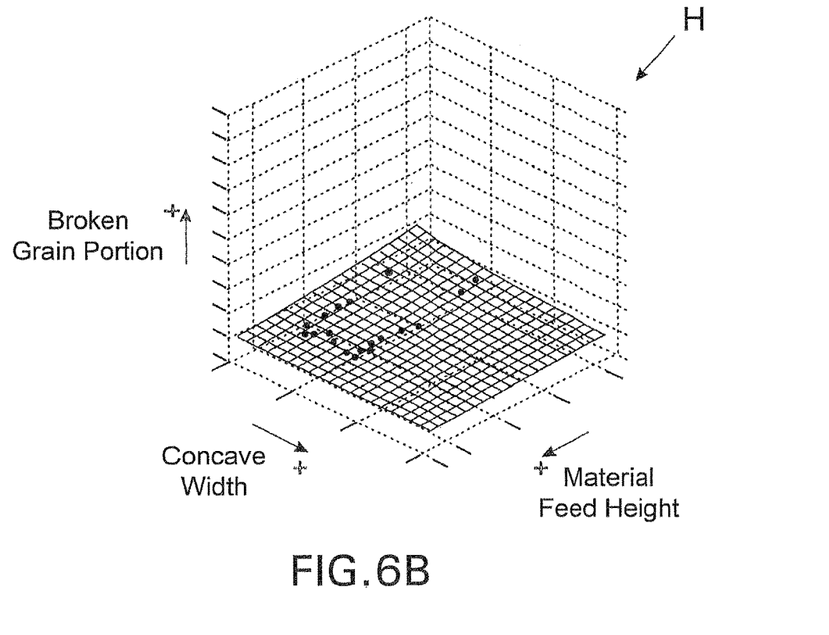
FIG. 6b shows the family of characteristics H for the functional interrelation between the output variable "broken grain portion" and the input variables "material feed height" and "concave width;"

FIG. 6b shows the family of characteristics H for the functional interrelation between the output variable "broken grain portion" and the input variables "material feed height" and "concave width." As indicated, as the material feed height, which represents the throughput, decreases and the concave width decreases, the broken grain portion increases.

Figure 7A:
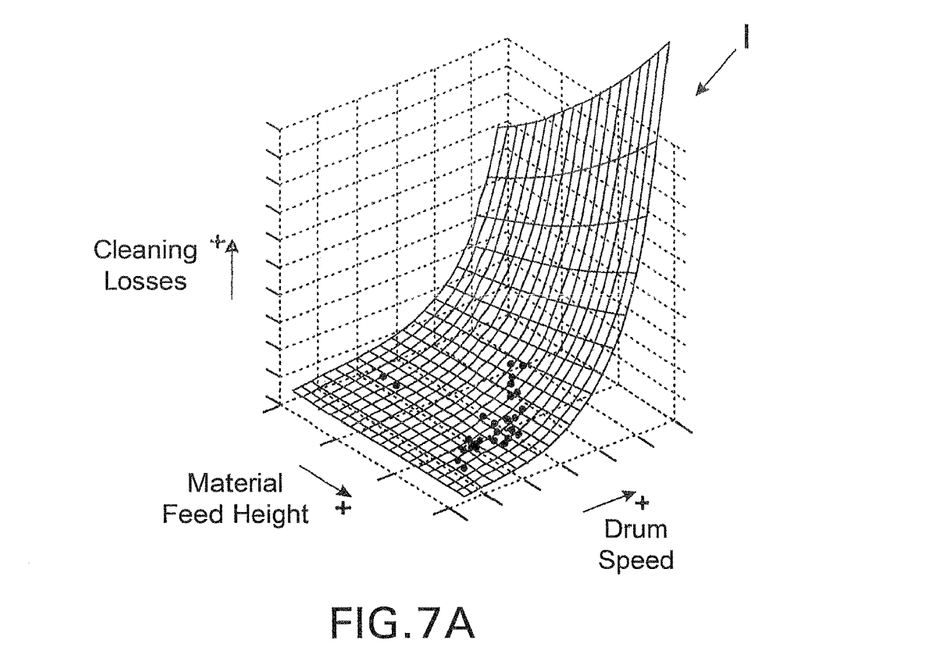
FIG. 7a shows the family of characteristics I for the functional interrelation between the output variable "cleaning losses" and the input variables "material feed height" and "drum speed.

FIG. 7a shows the family of characteristics I for the functional interrelation between the output variable "cleaning losses" and the input variables "material feed height" and "drum speed." As indicated, as the drum speed $1a$ increases and the material feed height, which represents the throughput, increases, the cleaning losses increase.

Figure 7B:
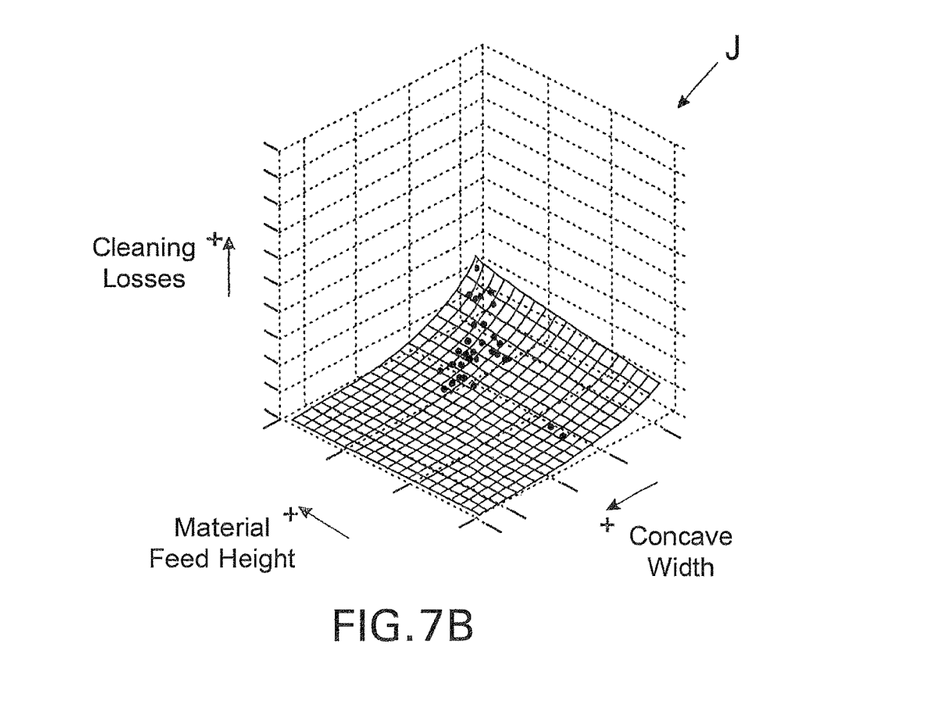
" and FIG. 7b shows the family of characteristics J for the functional interrelation between the output variable "cleaning losses" and the input variables "material feed height" and "concave width".

FIG. 7b shows the family of characteristics J for the functional interrelation between the output variable "cleaning losses" and the input variables "material feed height" and "concave width." As indicated, as the concave width $1b$ decreases and the material feed height, which represents the throughput, increases, the cleaning losses increase.

The above-described alignment of the system model $11b$ with the current harvesting-process state is preferably carried out, in the case of the system model $11b$ having at least one family of characteristics A-J, in that the computing unit 12 aligns at least one of the families of characteristics A-J with the harvesting-process state during the on-going harvesting operation, in particular cyclically. The definition of the system model $11b$ by the computing unit 12 depending on the sensor configuration $11c$ stored in the memory 11 includes not only the definition of the families of characteristics A-J but also a definition of the alignment of the system model $11b$.

A series of real sensor measured values is plotted for the particular harvesting-process state in each of the FIGS. 3 to 7. In the aformentioned alignment, the computing unit 12 implements a change in the particular family of characteristics A-J in order to move the family of characteristics A-J closer to the real sensor measured values. For example, the entire family of characteristics A-J is shifted in the direction of the particular output variable, which is upward or downward in FIGS. 3 to 7. It is particularly advantageous, however, when the shift of the family of characteristics A-J is achieved in such a way that it also induces a change in the curves of the particular characteristics.

Within the scope of the aforementioned definition of the system model $11b$, the computing unit 12 assigns different properties to the aforementioned families of characteristics A-J with respect to a possible alignment.

In a first variant, it is provided that the computing unit 12 defines at least one of the families of characteristics A-J as a dynamic family of characteristics and aligns it with the harvesting-process state, which was ascertained via sensors, during the on-going harvesting operation, in particular cyclically.

In a second variant it is provided that the computing unit 12 defines the assigned family of characteristics A-J as a static family of characteristics for at least one harvesting-process parameter of the parameter group and does not subject it to the alignment with the harvesting-process state, which was ascertained via sensors. This is preferably the case when the relevant harvesting-process parameter according to the sensor configuration $11c$ cannot be determined by the sensor system 15, i.e., a corresponding sensor 16 is not present or is not operational.

It also is preferably the case that the computing unit 12 permits input by the user for the harvesting-process parameter or of the harvesting-process parameter via an input/output device 19 for at least one harvesting-process parameter of the parameter group, in particular depending on the sensor configuration $11c$. Preferably, the computing unit 12 then aligns the relevant family of characteristics A-J on the basis of the user input. Alternatively, or additionally, the autonomous, in particular, determination of the at least one threshing-unit parameter $1a$, $1b$ is carried out on the basis of the user input. In this case, the computing unit 12 generates queries related to the particular harvesting-process parameter and outputs said queries via the input/output device 19. In response to such a query, the driver 13 can input at least a portion of the harvesting-process state via the input/output device. The input/output device 19 comprises suitable input elements $20a$ and output elements $20b$ for this purpose.

In order to enable a reaction to a change in the sensor configuration 15 during on-going operation, the computing unit 12 checks, in particular cyclically, whether all sensors 16 according to the sensor configuration 11 stored in the memory 11 are operational. For the operating case in which one sensor 16 or multiple sensors 16 is/are non-operational, the computing unit 12 implements a corresponding modification of the sensor configuration $11c$ and stores it in the memory 11. The new sensor configuration $11c$ can therefore be taken into consideration in the further operation in the manner described above.

The aforementioned definition of the system model $11b$ is demonstrated on the basis of the following three examples:

For a first operating case, in which the sensor configuration $11c$ comprises an operational separation-loss sensor $16b$ and cleaning-loss sensor $16e$, but does not comprise an operational broken-grain sensor $16d$ or an operational threshing-loss sensor $16a$, the computing unit 12 defines the families of characteristics G, H, A, B (FIGS. 6a, 6b, 3a, 3b) assigned to the harvesting-process parameters "broken grain" and "threshing" preferably as static families of characteristics and defines the families of characteristics C, D, I, J (FIGS. 4a, 4b, 7a, 7b) assigned to the harvesting-process parameters "separation losses" and "cleaning losses" as dynamic families of characteristics.

For a second operating case, in which the sensor configuration $11c$ comprises an operational separation-loss sensor $16b$, cleaning-loss sensor $16e$, and broken-grain sensor $16d$, but does not comprise an operational threshing-loss sensor $16a$, the computing unit 12 defines the family of characteristics A, B (FIGS. 3a, 3b) assigned to the harvesting-process parameter "threshing losses" as a static family of characteristics and defines the families of characteristics C, D, I, J, G, H (FIGS. 4a, 4b, 7a, 7b, 6a, 6b) assigned to the harvesting-process parameters "separation losses", "cleaning losses" and "broken-grain losses" as dynamic families of characteristics.

For a third operating case, in which the sensor configuration $11c$ comprises an operational separation-loss sensor $16b$, cleaning-loss sensor $16e$, broken-grain sensor $16d$, and threshing-loss sensor $16a$, the computing unit 12 defines the family of characteristics A, B (FIGS. 3a, 3b) assigned to the harvesting-process parameter "threshing losses" as a static family of characteristics and defines the families of characteristics C, D, I. J, G, H, A, B (FIGS. 4a, 4b, 78. 7b, 6a, 6b, 3a, 3b) assigned to the harvesting-process parameters "separation losses", "cleaning losses", "broken-grain losses", and "threshing losses" as dynamic families of characteristics.

LIST OF REFERENCE NUMBERS 1 threshing unit
$1a$ drum speed
$1b$ concave width
2 header 3 slope conveyor
4 threshing drum
5 threshing concave
6 separation device
7 cleaning device
8 spreader system
9 transport system
10 driver assistance system
11 memory
11a harvesting-process strategy
11b system model
11c sensor configuration
12 computing unit
13 driver
14 automated threshing unit
15 sensor system
16 sensor
16a threshing-loss sensor
16b separation-loss sensor
16c slip sensor
16d broken-grain sensor
16e cleaning-loss sensor
16f material feed height sensor
16g swath sensor
17 grain tank
18 swath
19 input/output device
20a input elements
20b output elements
A-J families of characteristics As will be evident to persons skilled in the art, the foregoing detailed description and figures are presented as examples of the invention, and that variations are contemplated that do not depart from the fair scope of the teachings and descriptions set forth in this disclosure. The foregoing is not intended to limit what has been invented, except to the extent that the following claims so limit that.

What is claimed is:

1. A combine harvester, comprising:
a threshing unit for threshing picked-up crop to obtain grain; and
a driver assistance system for controlling the threshing unit, wherein the driver assistance system comprises a memory for storing data;
a computing unit for processing at least the data stored in the memory; and
a sensor system, including operational sensors, for ascertaining at least a portion of a harvesting-process state,
wherein a sensor configuration is assigned to the sensor system, the sensor configuration defined by a type and a scope of operational sensors,
wherein the sensor configuration is stored in the memory,
wherein a functional system model for at least a portion of the combine harvester is stored in the memory, and
wherein the computing unit autonomously determines at least one threshing-unit parameter based on the functional system model and the harvesting-process state, and defines the system model forming a basis for controlling the threshing unit depending on the sensor configuration stored in the memory,
wherein the threshing unit, together with the driver assistance system, forms an automated threshing unit, in that a plurality of selectable harvesting-process strategies is stored in the memory and in that, in order to implement a particular selected harvesting-process strategy, the computing device is designed to autonomously determine at least one machine parameter and specify the at least one machine parameter to the threshing unit, and
wherein a parameter group of harvesting-process parameters is defined, to each of which at least one family of characteristics (A-J) of the system model, depicting functional interrelations of the combine harvester, is assigned and is stored in the memory and wherein a particular harvesting-process parameter is the output variable of the assigned, at least one family of characteristics (A-J).

2. The combine harvester according to claim 1, wherein, depending on the sensor configuration, the sensor system determines one or more of the following harvesting-process parameters: threshing losses, broken grain portion, material feed height, separation losses, cleaning losses, threshing-unit load and fuel consumption.

3. The combine harvester according to claim 1, wherein the computing unit aligns at least one of the families of characteristics (A-J) with the harvesting-process state, during on-going operation, and wherein the definition of the system model by the computing unit depending on the sensor configuration stored in the memory includes, in addition to the definition of the families of characteristics (A-J), a definition of the alignment of the system model.

4. The combine harvester according to claim 1, wherein the computing unit defines at least one of the families of characteristics (A-J) as a dynamic family of characteristics and aligns the dynamic family of characteristics with the harvesting-process state that was ascertained via sensors during the on-going harvesting operation.

5. The combine harvester according to claim 1, wherein the computing unit defines the assigned family of characteristics (A-J) as a static family of characteristics for at least one harvesting-process parameter of the parameter group, which, according to the system configuration, cannot be determined by the sensor system, and does not subject the family of characteristics to the alignment with the harvesting-process state, ascertained via sensors.

6. The combine harvester according to claim 1, wherein the computing unit permits input by a user for the harvesting-process parameter or of the harvesting-process parameter via an input/output device for at least one harvesting-process parameter of the parameter group, depending on the sensor configuration.

7. The combine harvester according to claim 1, wherein the computing unit aligns the family of characteristics (A-J) on a basis of a user input, carries out the autonomous determination of the at least one threshing-unit parameter on the basis of the user input.

8. The combine harvester according to claim 1, wherein in an operating case in which the sensor configuration comprises an operational separation-loss sensor, cleaning-loss sensor and broken-grain sensor, but does not comprise an operational threshing-loss sensor, the computing unit defines a family of characteristics (A, B) assigned to the harvesting-process parameter threshing losses as a static family of characteristics and defines families of characteristics (C, D, I, J, G, H) assigned to the harvesting-process parameters separation losses, cleaning losses and broken grain losses as dynamic families of characteristics.

9. The combine harvester according to claim 1, wherein in an operating case in which the sensor configuration comprises an operational separation-loss sensor, cleaning-loss sensor, broken-grain sensor, and threshing-loss sensor, the computing unit defines families of characteristics (C, D, I, J, G, H, A, B) assigned to the harvesting-process parameters separation losses, cleaning losses, broken-grain losses, and threshing losses as dynamic families of characteristics.

10. A combine harvester, comprising:
a threshing unit for threshing picked-up crop to obtain grain; and
a driver assistance system for controlling the threshing unit, wherein the driver assistance system comprises a memory for storing data;
a computing unit for processing at least the data stored in the memory; and
a sensor system, including operational sensors, for ascertaining at least a portion of a harvesting-process state,
wherein a sensor configuration is assigned to the sensor system, the sensor configuration defined by a type and a scope of operational sensors,
wherein the sensor configuration is stored in the memory,
wherein a functional system model for at least a portion of the combine harvester is stored in the memory, and
wherein the computing unit autonomously determines at least one threshing-unit parameter based on the functional system model and the harvesting-process state, and defines the system model forming a basis for controlling the threshing unit depending on the sensor configuration stored in the memory, and
wherein the computing unit checks cyclically, whether all the sensors according to the sensor configuration stored in the memory are operational and in that, for the operating case in which one sensor or multiple sensors is or are non-operational, the computing unit implements a corresponding modification of the sensor configuration and stores the modification in the memory.

11. A combine harvester, comprising:
a threshing unit for threshing picked-up crop to obtain grain; and
a driver assistance system for controlling the threshing unit, wherein the driver assistance system comprises a memory for storing data;
a computing unit for processing at least the data stored in the memory; and
a sensor system, including operational sensors, for ascertaining at least a portion of a harvesting-process state,
wherein a sensor configuration is assigned to the sensor system, the sensor configuration defined by a type and a scope of operational sensors,
wherein the sensor configuration is stored in the memory,
wherein a functional system model for at least a portion of the combine harvester is stored in the memory, and
wherein the computing unit autonomously determines at least one threshing-unit parameter based on the functional system model and the harvesting-process state, and defines the system model forming a basis for controlling the threshing unit depending on the sensor configuration stored in the memory, and
wherein in an operating case in which the sensor configuration comprises an operational separation-loss sensor and cleaning-loss sensor, but does not comprise an operational broken-grain sensor or an operational threshing-loss sensor, the computing unit defines families of characteristics (G, H, A, B) assigned to the harvesting-process parameters broken grain and threshing as static families of characteristics and defines the families of characteristics (C, D, I, J) assigned to the harvesting-process parameters separation losses and cleaning losses as dynamic families of characteristics.

* * * * *